US011674013B2

(12) United States Patent
Gessler et al.

(10) Patent No.: US 11,674,013 B2
(45) Date of Patent: Jun. 13, 2023

(54) COMPOSITION FOR USE IN ADDITIVE MANUFACTURING PROCESSES

(71) Applicant: EOS GmbH Electro Optical Systems, Krailling (DE)

(72) Inventors: Monika Gessler, Munich (DE); Stefan Paternoster, Andechs (DE); Daniel Froehlich, Graefelfing (DE)

(73) Assignee: EOS GmbH Electro Optical Systems, Krailling (DE)

( * ) Notice: Subject to any disclaimer, the term of this patent is extended or adjusted under 35 U.S.C. 154(b) by 360 days.

(21) Appl. No.: 16/756,273

(22) PCT Filed: Oct. 12, 2018

(86) PCT No.: PCT/EP2018/077932
§ 371 (c)(1),
(2) Date: Apr. 15, 2020

(87) PCT Pub. No.: WO2019/076767
PCT Pub. Date: Apr. 25, 2019

(65) Prior Publication Data
US 2020/0317885 A1 Oct. 8, 2020

(30) Foreign Application Priority Data
Oct. 16, 2017 (DE) ..................... 10 2017 124 047.0

(51) Int. Cl.
| C08K 9/06 | (2006.01) |
| C08K 3/36 | (2006.01) |
| B33Y 10/00 | (2015.01) |
| B33Y 70/00 | (2020.01) |
| B29C 64/135 | (2017.01) |
| C08K 5/56 | (2006.01) |
| B29K 75/00 | (2006.01) |
| B29K 101/12 | (2006.01) |
| B29K 105/00 | (2006.01) |

(52) U.S. Cl.
CPC .............. C08K 3/36 (2013.01); B29C 64/135 (2017.08); B33Y 10/00 (2014.12); B33Y 70/00 (2014.12); C08K 5/56 (2013.01); C08K 9/06 (2013.01); B29K 2075/00 (2013.01); B29K 2101/12 (2013.01); B29K 2105/0008 (2013.01)

(58) Field of Classification Search
CPC ... C08K 3/36; C08K 5/56; C08K 9/06; B29K 2075/00; B29K 2101/12; B29K 2105/0008; B29C 64/135; B33Y 10/00; B33Y 70/00
USPC ......................................................... 523/212
See application file for complete search history.

(56) References Cited

U.S. PATENT DOCUMENTS

| 6,110,411 A | 8/2000 | Clausen et al. |
| 6,228,927 B1 | 5/2001 | Lucarelli et al. |
| 6,852,787 B1 | 2/2005 | McMichael et al. |
| 7,101,926 B2 | 9/2006 | McMichael et al. |
| 7,211,615 B2 | 5/2007 | Baumann et al. |
| 8,313,087 B2 | 11/2012 | Hesse et al. |
| 9,777,134 B2 | 10/2017 | Uenlue et al. |
| 2001/0020060 A1 | 9/2001 | Lucarelli et al. |
| 2004/0204531 A1 | 10/2004 | Baumann et al. |
| 2005/0085581 A1 | 4/2005 | McMichael et al. |
| 2006/0241233 A1 | 10/2006 | McMichael et al. |
| 2007/0034840 A1 | 2/2007 | McMichael et al. |
| 2007/0048531 A1* | 3/2007 | Nagaoka ............... C08J 7/046 427/508 |
| 2008/0207842 A1* | 8/2008 | Barthel ............... C08G 18/6254 525/50 |
| 2009/0291308 A1 | 11/2009 | Pfister et al. |
| 2015/0152214 A1 | 6/2015 | Uenlue et al. |
| 2017/0025485 A1* | 1/2017 | Kim .................... H01L 51/5237 |
| 2018/0264753 A1* | 9/2018 | Kornilovich .......... B29C 67/248 |
| 2018/0355123 A1 | 12/2018 | Diekmann et al. |
| 2020/0362120 A1* | 11/2020 | Frangov ................ C08J 3/203 |

FOREIGN PATENT DOCUMENTS

| CN | 1255887 | 6/2000 |
| CN | 1293701 | 5/2001 |
| CN | 1372577 | 10/2002 |
| CN | 101148541 A | 3/2008 |
| CN | 102604335 | 7/2012 |
| CN | 103936899 A | 7/2014 |
| CN | 105462134 | 4/2016 |
| CN | 107141701 | 9/2017 |
| DE | 10251790 | 5/2004 |
| DE | 102004012683 | 10/2005 |
| DE | 102013113320 | 6/2015 |
| DE | 102015016131 | 6/2017 |
| EP | 2479207 | 7/2012 |
| EP | 2479208 | 7/2012 |

(Continued)

OTHER PUBLICATIONS

Machine Translation of CN 107141701 (Year: 2017).*
Fundamentals of Mechanical Manufacturing Technology/Editors-in-Chief, Wang Tong-yue and Xu Zhaomei.—Beijing: Beijing Institute of Technology Press, 2017.7 ISBN 978-7-5682-4610-1, pp. 275-278, (English translation attached).

(Continued)

Primary Examiner — Hannah J Pak
(74) Attorney, Agent, or Firm — Seyfarth Shaw LLP

(57) ABSTRACT

The present invention relates to a composition comprising at least one polymer system and at least one anti-agglomeration agent, the polymer system being selected from at least one thermoplastic polymer, the bulk density of the composition being more than 300 g/l. Furthermore, the present invention relates to a method for producing the composition according to the invention and its use.

15 Claims, No Drawings

(56) References Cited

FOREIGN PATENT DOCUMENTS

WO    2005090056    9/2005

OTHER PUBLICATIONS

Chinese Office Action for Application No. 201880067683.9, dated Sep. 5, 2022, 8 pages.
European Office Action for Application No. 18789580.0, dated Sep. 13, 2022, 5 pages.

* cited by examiner

COMPOSITION FOR USE IN ADDITIVE MANUFACTURING PROCESSES

TECHNICAL FIELD OF THE INVENTION

The present invention relates to a composition comprising at least one polymer system and at least one anti-agglomeration agent, the polymer system being selected from at least one thermoplastic polymer, the bulk density of the composition being more than 300 g/l. Furthermore, the present invention relates to a method for producing the composition according to the invention and its use.

BACKGROUND OF THE INVENTION

The provision of prototypes and the industrial manufacture of components are becoming increasingly important. Particularly suitable are additive manufacturing processes which work on the basis of powdery materials and in which the desired structures are produced in layers by selective melting and solidification or by applying a binder and/or adhesive.

Additive manufacturing processes enable the production of plastic objects. The process is also known as "additive manufacturing", "digital fabrication" or "three-dimensional (3D) printing". This process has been used in industrial development processes for the production of prototypes for decades (rapid prototyping). A few years ago, however, the technological progress of the systems also started with the manufacture of parts that meet the quality requirements of an end product (rapid manufacturing).

In practice, the term "additive manufacturing" is often replaced by "generative manufacturing" or "rapid technology". Additive manufacturing processes that use a powdery material are, for example, sintering, melting or bonding using binders.

Polymer systems, metal systems and ceramic systems are generally used as powdered materials for the production of molded articles. Industrial users of such systems require good processability, high dimensional accuracy and good mechanical properties of molded articles produced therefrom.

The properties of the powder starting material are selected depending on the desired properties of the molded article to be produced. A suitable bulk density and sufficient pourability of the powder material are important.

Bulk density is the density, that is, the mass per volume, of a mixture of a granular solid ("bulk material") and a continuous fluid that fills the voids between the particles of the granular solid. The bulk density, that is, the density of a granular solid which has not been compacted by, for example, tamping or shaking, but rather by pouring, can be influenced by its particle size or particle diameter and particle properties. In order to reduce the porosity of the resulting components, polymer systems that are usually used have small particle sizes or particle diameters. However, it is possible for the particles to agglomerate here. If such polymer systems are poured, for example, into a powder bed of a laser sintering system, clumps, that is, inhomogeneous particle distributions, can form which do not melt continuously and whereby a molded article of inhomogeneous material is obtained, the mechanical stability of which may be reduced. Finally, clumps that occur during pouring can impair the pourability and thus limit the dosability.

Anti-agglomeration agents are therefore often added, which attach to the particles of the polymer system and counteract clumping, which can occur, for example, during pouring processes and/or when applied in the powder bed, in order to obtain a uniformly distributed powder which can subsequently be melted uniformly, whereby the molded articles produced using such a powder show improved mechanical properties.

With many polymer systems from the prior art, however, the introduction, in particular the dosing and coating, of the powder and its melting behavior are not optimal. For example, homogeneous melt films cannot form when layers are applied irregularly during melting. This leads to irregularities in the subsequent layers, whereby the accuracy of the production of the molded articles and their mechanical properties are impaired.

In the end, polymer systems often show a tendency to warp after the sintering process. The desired dimensions can therefore often not be maintained in the case of molded articles which are produced from such polymer systems.

SUMMARY OF THE INVENTION

It is therefore the object of the present invention to provide a composition which is suitable, in particular in additive manufacturing processes, as a material for the production of molded articles having reliable mechanical stability and high dimensional accuracy.

This object is achieved according to the invention by a composition according to claim 1, which comprises at least one polymer system and at least one anti-agglomeration agent. Furthermore, the object is achieved by a method for production according to claim 16, by an article according to claim 19 and by a use of the composition according to the invention according to claim 20.

The present invention therefore relates to a composition comprising
(a) at least one polymer system and
(b) at least one anti-agglomeration agent,
the polymer system being selected from at least one thermoplastic polymer, the thermoplastic polymer being selected from polyetherimide, polycarbonate, polyphenylene sulfone, polyphenylene oxide, polyether sulfone, acrylonitrile-butadiene-styrene copolymer (ABS), acrylonitrile-styrene-acrylate copolymer (ASA), polyvinyl chloride, polyacrylate, polyester, polyamide, polyaryl ether ketone, polyether, polyurethane, polyimide, polyamide imide and/or polyolefin, in particular of polyurethane, and the bulk density of the composition being at least 300 g/l, preferably at least about 350 g/l, particularly preferably at least about 420 g/l, in particular at least about 450 g/l, and/or wherein the bulk density is up to about 550 g/l, preferably up to about 530 g/l, in particular up to about 510 g/l.

DETAILED DESCRIPTION OF THE EMBODIMENTS

In its simplest embodiment, a composition according to the invention comprises a polymer system and an anti-agglomeration agent, wherein the polymer system is selected from at least one thermoplastic polymer, wherein the thermoplastic polymer is selected from polyetherimide, polycarbonate, polyphenylene sulfone, polyphenylene oxide, polyether sulfone, acrylonitrile-butadiene-styrene copolymer (ABS), acrylonitrile-styrene-acrylate copolymer (ASA), polyvinyl chloride, polyacrylate, polyester, polyamide, polyaryl ether ketone, polyether, polyurethane, polyimide, polyamideimide and/or polyolefin, in particular from polyurethane.

Since the at least one anti-agglomeration agent, for example, can effectively prevent caking and thus aggregation of particles of the polymer system in the composition, the formation of voids during pouring is generally counteracted and the bulk density of the composition is thus advantageously increased. Bulk density here refers to the ratio of the mass of a granular solid which has been compacted by pouring and not, for example, by tamping or shaking, to the bulk volume taken up. The determination of the bulk density is known to the person skilled in the art and can be determined, for example, in accordance with DIN EN ISO 60:2000-01.

According to the invention, the composition of the polymer system and anti-agglomeration agent has a bulk density of more than 300 g/l, preferably at least about 350 g/l, particularly preferably at least about 420 g/l, in particular at least about 450 g/l. However, the bulk density of the composition is at most about 550 g/l, particularly preferably up to about 530 g/l, in particular up to about 510 g/l.

Such a composition according to the invention advantageously ensures a homogeneous powder structure, so that this enables improved flowability or pourability and thus a uniform input of powder. A good flowability of a bulk material is provided when the bulk material can easily be made to flow. The particles of a powdery bulk material are essentially retained here or do not change their shape during transport. The most important parameter for this is pourability.

In the present patent application, a polymer system is understood to mean at least one homopolymer and/or a heteropolymer which is made up of a plurality of monomers. While homopolymers have a covalent chain of the same monomers, heteropolymers (also called copolymers) are made up of covalent chains of different monomers. A polymer system according to the present invention can comprise both a mixture of the above-mentioned homopolymers and/or heteropolymers or more than one polymer system. Such a mixture is also referred to as polymer blend in the present patent application.

Heteropolymers within the meaning of the present invention can be selected from statistical copolymers in which the distribution of the two monomers in the chain is random, from gradient copolymers, which are in principle similar to the statistical copolymers, but in which the proportion of one monomer in the course of the chain increases and the other decreases, from alternating copolymers in which the monomers alternate, from block copolymers or segment copolymers which consist of longer sequences or blocks of each monomer, and from graft copolymers in which blocks of a monomer are grafted onto the backbone of another monomer.

The polymer system is preferably selected from at least one homopolymer or heteropolymer or from a polymer blend, wherein the at least one homopolymer or heteropolymer or polymer blend particularly preferably comprises a partially crystalline homopolymer and/or heteropolymer and/or amorphous homopolymer and/or heteropolymer. In particular, a heteropolymer or a polymer blend has one or more polymer systems comprising at least two different repeating units.

According to a particularly preferred embodiment, the composition according to the invention comprises a polymer system which is preferably selected from at least one thermoplastic polymer. Thermoplastic polyurethanes (TPU) are generally block copolymers, which consist of alternating sequences of hard and soft segments, which are formed by addition polymerization from (1) diisocyanates and short-chain diols (so-called chain extenders) and (2) diisocyanates and long-chain diols. A large number of different TPUs can be produced via the ratio, the structure and the molecular weight of the reaction components.

Polymer systems often have a positive and/or negative partial charge. In particular, when particles of the polymer system have different charges at different locations on the surface, interactions, for example, by electrostatic, magnetic and/or Van der Waals forces between neighboring particles, can occur, which result in undesired agglomeration of the polymer system particles.

The composition according to the invention therefore comprises at least one anti-agglomeration agent. In the present patent application, an anti-agglomeration agent is understood to mean a substance in the form of particles which, among other things, can attach to the surface of the polymer system particles. In this patent application, attachment is understood to mean that particles of the anti-agglomeration agent shrink, for example, through electrostatic forces, chemical bonds (for example, ionic and covalent bonds) and hydrogen bonds, and/or magnetic forces and/or Van der Waals forces interact with particles of the polymer system and come into relative spatial proximity to one another such that particles of the polymer system advantageously do not come into direct contact with one another, but are separated from one another by particles of the anti-agglomeration agent. The polymer system particles which are spatially separated in this way generally establish weak or no interactions with one another, so that the addition of anti-agglomeration agents advantageously counteracts clumping of the composition.

The composition according to the invention can advantageously be used for additive manufacturing processes. Additive manufacturing processes include in particular processes that are suitable for the production of prototypes (rapid prototyping) and components (rapid manufacturing), preferably from the group of powder bed-based processes including laser sintering, high-speed sintering, multi-jet fusion, binder jetting, selective mask sintering or selective laser melting. In particular, however, the composition according to the invention is intended for use in laser sintering. The term "laser sintering" is to be understood as synonymous with the term "selective laser sintering"; the latter is just the older name.

A further use of the composition according to the invention is its use as a grinding aid, for example, to improve process reliability and increase the throughput and reduce the particle size heterogeneity of the grinding.

Furthermore, the present invention relates to a method for producing a composition according to the invention, wherein the method comprises the following steps:
 (i) providing at least one polymer system, the at least one polymer system being selected from at least one thermoplastic polymer, the thermoplastic polymer being selected from polyetherimide, polycarbonate, polyphenylene sulfone, polyphenylene oxide, polyether sulfone, acrylonitrile-butadiene-styrene copolymer (ABS), acrylonitrile-styrene acrylate copolymer (ASA), polyvinyl chloride, polyacrylate, polyester, polyamide, polyaryl ether ketone, polyether, polyurethane, polyimide, polyamideimide and/or polyolefin, in particular from polyurethane,
 (ii) adding a first anti-agglomeration agent, (iii) mixing the at least one polymer system with the first anti-agglomeration agent, (iv) optionally packaging the composition.

Provision is understood to mean both on-site production as well as delivery of a polymer system.

Insofar as the composition according to the invention is packaged, a packing process advantageously takes place by exclusion of moisture.

Insofar as a composition according to the invention comprises more than one anti-agglomeration agent, a second anti-agglomeration agent is preferably added to a polymer system in which no anti-agglomeration agent has yet been mixed. The at least one polymer system comprising the first anti-agglomeration agent (PA1) is then mixed with the at least one polymer system comprising the second anti-agglomeration agent (PA2) to produce a total mixture comprising at least one polymer system containing two anti-agglomeration agents. The procedure is analogous when three or more anti-agglomeration agents are used. Mixtures PA1 and PA2 (or further mixtures) can of course comprise different polymer systems, as explained at the outset.

An optional packaging of a composition produced by the method according to the invention is preferably carried out with the exclusion of atmospheric moisture, so that the composition according to the invention can subsequently be stored under reduced moisture to avoid, for example, caking effects, thereby improving the storage stability of the composition according to the invention. An advantageous packaging material also prevents moisture, in particular atmospheric moisture, from entering the composition according to the invention.

A composition produced by the method according to the invention is advantageously used as a solidifiable powder material in a method for the layer-by-layer production of a three-dimensional object from powdery material, in which successive layers of the object to be formed from this solidifiable powder material are successively solidified at corresponding or predetermined locations by the input of energy, preferably of electromagnetic radiation, in particular by the input of laser light.

The present invention also comprises a composition, in particular for laser sintering processes, which can be obtained by the process described above.

Finally, a composition according to the invention is used to produce a component, in particular a three-dimensional object, through layer-by-layer application and selective solidification a construction material, preferably a powder. The term "solidification" in this case is understood to mean at least partial melting or fusing with subsequent solidification or re-solidification of the construction material. An advantageous method comprises at least the following steps:

(i) providing the construction material, (ii) applying a layer of the construction material to a construction field, (iii) selectively solidifying the applied layer of the construction material at locations which correspond to a cross section of the object to be produced, preferably by means of an irradiation unit, and (iv) lowering the carrier and repeating the steps of applying and solidifying until the component, in particular the three-dimensional object, is completed.

In the present patent application, construction material is understood to mean a powder or a solidifiable powder material which can be solidified into flexible molded articles by means of additive manufacturing processes, in particular by means of laser sintering or laser melting.

The composition according to the invention is particularly suitable as such a construction material.

In this case, a platform is used as the construction field, which is located on a carrier within a machine for additive manufacturing at a certain distance from an irradiation unit mounted above it, which is suitable for solidifying the construction material. The construction material is positioned on the carrier so that its top layer coincides with the level that is to be solidified. The carrier can be adjusted in the course of the manufacturing process, in particular laser sintering, so that each newly applied layer of the construction material is at the same distance from the irradiation unit and can be solidified in this way by the action of the irradiation unit.

The composition according to the invention is used both in rapid prototyping and in rapid manufacturing. Here, for example, additive manufacturing processes, in particular laser sintering processes, are used, in which three-dimensional objects are formed in layers by selectively projecting a laser beam having a desired energy onto a powder bed of powdery materials. This process enables prototypes or manufacture parts to be manufactured in a time and cost-efficient manner.

Rapid manufacturing means, in particular, processes for the production of components, that is, the production of more than one same part, but in which the production, for example, by means of an injection mold is not economical or not possible due to the geometry of the article, especially when the parts have a very complex design. Examples of this are parts for high-quality cars, racing or rally vehicles that are only produced in small quantities, or spare parts for motorsport, in which, in addition to the small quantities, the time of availability also plays a role. Industries in which the parts according to the invention are used can, for example, be the aerospace industry, medical technology, mechanical engineering, automotive engineering, sports industry, household goods industry, electronics industry and lifestyle. Also of importance is the production of a large number of similar components, for example, personalized components such as prostheses, (inner ear) hearing aids and the like, the geometry of which can be individually adapted to the wearer.

Further particularly advantageous refinements and developments of the invention result from the dependent claims and the following description, the patent claims of a particular category also being able to be further developed in accordance with the dependent claims of another category and features of different embodiments being able to be combined to form new embodiments.

As mentioned at the outset, the composition according to the invention comprises at least one anti-agglomeration agent. Such an anti-agglomeration agent can be selected from the group of metal soaps. Metal soaps are sold for example, in the CEASIT (calcium stearate), ZINCUM (zinc stearate) and MAGNESIUMSTEARAT (magnesium stearate) series by Bärlocher (Germany), or in the Licomont® series in various modifications by Clariant (Germany). An anti-agglomeration agent is preferably selected from a silicon dioxide, stearate, tricalcium phosphate, calcium silicate, aluminum oxide, magnesium oxide, magnesium carbonate, zinc oxide or mixtures of the like.

According to a preferred embodiment, a first anti-agglomeration agent comprises silicon dioxide. This can be produced by a wet chemical precipitation process or pyrogenic silicon dioxide. However, the silicon dioxide is particularly preferably pyrogenic silicon dioxide. Pyrogenic silicon dioxide is sold, for example, in the Aerosil® series from Evonik (Germany) or HDK® from Wacker Chemie (Germany), as explained later.

In the present patent application, a pyrogenic silicon dioxide is understood to mean silicon dioxide which was produced in accordance with known processes, for example, by flame hydrolysis by adding liquid tetrachlorosilane to the hydrogen flame. Silicon dioxide is also referred to as silica in the following.

In the unmodified state, fumed silica is covered with silanol groups (—SiOH), whereby the surface of the silica generally has a hydrophilic character. In order to reduce the number of hydrogen bonds frequently occurring between silanol groups or to reduce interparticular electrostatic attractive forces, the silanol groups on the surface of the particles of the at least one anti-agglomeration agent are modified in a preferred embodiment with at least one hydrophobizing agent, in particular based on organosilanes.

In the present patent application, organosilanes are understood to mean compounds which either have direct silicon-carbon bonds or in which the carbon is linked to the silicon via oxygen, nitrogen or sulfur atoms.

By modifying the surface of the particles of the first anti-agglomeration agent with organosilanes, the number of silanol groups is advantageously significantly reduced, with the result that the surface of the silica obtains a more or less pronounced hydrophobic character.

The density of the silanol groups on the surface of the at least one anti-agglomeration agent after modification with an organosilane is advantageously below 0.5 per $nm^2$, so that interparticular hydrogen bonds can be neglected and the modified silica has a hydrophobic character.

This hydrophobic character is desirable because the anti-agglomeration agent particles modified with at least one hydrophobizing agent, which particles advantageously separate the polymer system particles from one another in the manner described above, can generally more effectively reduce the adhesive forces between the polymer system particles than hydrophilic anti-agglomeration agent particles. This enables a better flowability of the composition. This also plays a role in particular for hygroscopic polymer systems or particles, since hydrophobic anti-agglomeration agents are embedded in the water film, which usually surrounds the hygroscopic polymer particles, and thus separate the polymer particles from one another.

According to a particularly preferred embodiment, a composition according to the invention comprises a second anti-agglomeration agent and thus advantageously enables a further improved coordination of the physical properties, for example, with regard to the electrostatic, the magnetic and/or the van der Waals forces of the anti-agglomeration agent, to the polymer system(s) and thus an improved processability of the composition, in particular in laser sintering processes.

According to a particularly preferred embodiment, the second anti-agglomeration agent is also a silicon dioxide, in particular pyrogenic silicon dioxide, which is modified on its particle surface with at least one hydrophobizing agent, in particular based on organosilanes.

Of course, a composition according to the invention can also have more than two anti-agglomeration agents, but it is preferred for the composition according to the invention to comprise only two anti-agglomeration agents.

The at least one or the two or more anti-agglomeration agent(s) can in principle be treated with one or also with a plurality of different hydrophobizing agents.

In a preferred embodiment, the particles, in particular the silanol groups on the surface of the first anti-agglomeration agent, are modified with a first hydrophobizing agent based on organosilanes, which agent is selected from alkoxysilanes, silazanes and/or siloxanes, in particular from polydimethylsiloxane (PDMS) and/or hexamethyldisilazane (HMDS), particularly preferably from hexamethyldisilazane. Such a hydrophobized anti-agglomeration agent reduces the cohesive interactions, which are more pronounced in fine polymer particles than the gravitational forces and can therefore lead to caking. According to a particularly preferred embodiment, the first anti-agglomeration agent is modified with only one hydrophobizing agent, which is selected in particular from HMDS.

In a particularly preferred embodiment, the particles of the second anti-agglomeration agent are modified on their surface with a second hydrophobizing agent, which in turn can enter into intramolecular and/or intermolecular interactions with the second anti-agglomeration agent. This second hydrophobizing agent can be selected from polydimethylsiloxane (PDMS) and/or hexamethyldisilazane (HMDS). According to a particularly preferred embodiment, the second anti-agglomeration agent is modified with only one hydrophobizing agent, which is very particularly preferably selected from PDMS.

In principle, the particles of the first and/or second anti-agglomeration agent can have an additional functionalization on their surface. According to a preferred embodiment, the particles of the first and/or the second anti-agglomeration agent can additionally be functionalized on their surface with amino, amide and/or quaternary ammonium groups, in order to counteract, for example, a triboelectric charge that may arise during production due to friction on the container wall.

The at least two anti-agglomeration agents modified in the manner described above advantageously have particularly good attachment properties to the particles of the at least one polymer system, in particular comprising thermoplastic polyurethane, and thus impart a marked improvement in the flowability or the pourability of the composition.

Insofar as a composition comprises the first and second anti-agglomeration agents, the flow properties of the composition can also be influenced by the mixing ratio of the anti-agglomeration agents.

According to a preferred embodiment, the first anti-agglomeration agent has a weight ratio to the second anti-agglomeration agent of at least about 1:1, preferably at least about 2:1. However, the weight ratio of the first anti-agglomeration agent to the second anti-agglomeration agent is at most about 1:3, preferably at most about 1:2. In this case, the dividend of the stated ratios determines the part by weight of the first anti-agglomeration agent and the divisor the part by weight of the second anti-agglomeration agent.

It has been shown that the production process for mixing the at least two anti-agglomeration agents can influence the flow properties of the composition. In principle, the anti-agglomeration agents can first be mixed in one process and then mixed with the at least one polymer system. However, it is preferred for the anti-agglomeration agents to be added to the polymer system one after the other.

According to a preferred embodiment, an advantageous composition contains the at least one anti-agglomeration agent or optionally a second anti-agglomeration agent in a total proportion by weight of at least about 0.01%, preferably of at least about 0.03%. A total proportion by weight is understood to mean the total proportion by weight of all anti-agglomeration agents used.

However, in order to minimize a possible undesirable influence of the at least one anti-agglomeration agent, which, for example, can lead to a shielding of the polymer particles and thus make it more difficult for the melt to flow together, the at least one anti-agglomeration agent should only be added in an amount sufficient to ensure a good dosability of the composition. The total proportion by weight of the at least one anti-agglomeration agent or optionally a second anti-agglomeration agent in the composition is therefore advantageously a total of at most about 1% by weight, preferably at most about 0.8% by weight, in particular at most about 0.5% by weight, particularly preferably at most about 0.2% by weight.

In order to ensure sufficient attachment of the particles of the at least one anti-agglomeration agent to the particles of the at least one polymer system, it has further proven to be advantageous for the particles of the anti-agglomeration agent to have the largest possible surface area. The surface here can be determined, for example, by gas adsorption based on the Brunauer, Emmet and Teller (BET) principle; the standard used is DIN EN ISO 9277. The particle surface determined by this method is also referred to as the BET surface.

According to a preferred embodiment, the BET surface area of the at least one anti-agglomeration agent is therefore advantageously at least about 200 $m^2/g$, preferably at least about 230 $m^2/g$, and/or at most about 350 $m^2/g$, particularly preferably at most about 330 $m^2/g$.

The particle size or the particle diameter should also be defined in this context. However, it should be mentioned here that in the case of anti-agglomeration agents, in particular of pyrogenic silicon dioxide, the nanoscale primary particles as a rule come together during the production process to form larger aggregates and/or agglomerates. Aggregates and/or agglomerates are therefore usually found when determining the average particle size of the at least one anti-agglomeration agent.

In order to enable the particles of the anti-agglomeration agent to uniformly attach to the polymer system particles, in a preferred embodiment, the at least one anti-agglomeration agent and optionally a second anti-agglomeration agent have an average diameter of the agglomerate particles d50 of at least about 100 nm, preferably of at least about 200 nm, in particular of at least about 250 nm. However, the average diameter of the agglomerate particles d50 is at most about 500 nm, preferably at most about 400 nm, in particular at most about 300 nm.

The average diameter of the agglomerate particles d50 indicates that 50% of the agglomerate particles are below the particle diameter mentioned. Suitable methods for determining the average diameter d50 of the agglomerate particles are known to the person skilled in the art and can be carried out, for example, by means of PCS (photon correlation spectrometry), scanning electron microscopy (SEM) or transmission electron microscopy (TEM).

The attachment of the particles of the at least one anti-agglomeration agent to the polymer system particles here does not only depend on the average agglomerate particle diameter of the at least one anti-agglomeration agent, but also on the ratio of the average agglomerate particle diameter of the at least one anti-agglomeration agent to the average diameter d50 of the particles of the at least one polymer system. Suitable methods for determining the average diameter of the particles of a polymer system are known to the person skilled in the art and can be carried out, for example, by means of laser diffraction or scanning electron microscopy.

It has been found that the processability, in particular the coatability and the mechanical properties of the resulting components, can be improved here. This is particularly advantageous when using a polymer system comprising, in particular a TPU, which has been comminuted by grinding processes and to which at least one anti-agglomeration agent has been added.

According to a preferred embodiment, the average diameter of the particles d50 of the at least one polymer system, in particular a thermoplastic polyurethane, to the average diameter of the agglomerate particles d50 of the at least one anti-agglomeration agent, has a ratio of at least about 100:1, preferably of at least about 500:1. However, the ratio of the average diameter of the particles d50 of the at least one polymer system, in particular the thermoplastic polyurethane, to the average diameter of the agglomerate particles d50 of the at least one anti-agglomeration agent is at most about 5000:1, preferably at most about 1000:1.

Insofar as a composition comprises two or more anti-agglomeration agents, the ratio mentioned of the average diameter of the particles d50 of the at least one polymer system, in particular the thermoplastic polyurethane, to the average diameter of the agglomerate particles d50 of the at least one anti-agglomeration agent advantageously relates to the average diameter of the particles d50 of the at least one a polymer system, in particular of the thermoplastic polyurethane, to the average diameter of the agglomerate particles d50 of the at least two anti-agglomeration agents.

As mentioned above, compositions according to the invention are suitable for additive manufacturing processes, in particular for laser sintering processes. Usually, the target environment, for example, the powder bed of the irradiation unit, in particular the laser beam, is already heated up before it is used, so that the temperature of the powder starting material is close to its melting point and only a small energy input is sufficient to increase the total energy input so that the particles coalesce with one another or solidify. In this case, energy-absorbing and/or energy-reflecting substances can further be applied to the target environment of the irradiation unit, as is known, for example, from the processes of high-speed sintering or multi-jet fusion.

However, the heat introduced by the heating or the laser can lead to individual components of the composition, such as the polymer system, to decompose. Advantageous compositions therefore have a melting point which is below 450° C. The melting point of the composition is preferably in the range from about 80 to about 400° C.

"Melting" is understood here to mean the process in which the powder is at least partially melted during an additive manufacturing process, for example, in a powder bed, by inputting energy, preferably by means of electromagnetic waves, in particular by laser beams. The composition according to the invention ensures at least partial melting and manufacture of reliable molded articles with high mechanical stability and dimensional accuracy.

It has also been shown that the melting point of the composition can be further reduced by the choice of the polymer system. According to a particularly preferred embodiment, the melting point of the composition, in particular comprising thermoplastic polyurethanes, is therefore at least about 100° C., preferably at least about 120° C., particularly preferably at least about 140° C., and/or at most about 200° C., preferably at most about 180° C., particularly preferably most about 160° C.

It has further been shown that the tensile strength and elongation at break can be useful as a measure of the processability of the composition according to the invention.

The tensile strength and elongation at break are material properties. The tensile strength here characterizes the maximum mechanical tensile stress that can occur in the material; the elongation at break characterizes the deformability of a material in the plastic range (also called ductility) until it breaks. According to a further preferred embodiment, the composition has a tensile strength of at least about 5 MPa, preferably of at least about 25 MPa, in particular of at least about 50 MPa, and/or of at most about 150 MPa, preferably of at most about 100 MPa, in particular of at most about 75 MPa. Preferred values for the elongation at break of the composition according to the invention are at least about 1%, preferably at least about 5%, in particular at least about 50%, and/or at most about 500%, preferably at most about 250%, in particular at most about 100%. The tensile strength and elongation at break can be determined with the aid of the so-called tensile test according to DIN EN ISO 527 and is known to the person skilled in the art.

Furthermore, the composition according to the invention can be evaluated for its dosability in the cold and warm state in the laser sintering system, its layer application and powder bed state in the cold and warm state, its layer application in the ongoing laser sintering process, in particular its coating on exposed surfaces, the dimensional accuracy of the test specimens obtained and their mechanical properties.

According to a further preferred embodiment, a preferred composition is produced as follows:
  (i) sieving the at least one or at least two anti-agglomeration agents,
  (ii) adding or mixing in the first anti-agglomeration agent to the thermoplastic polymer, wherein the thermoplastic polymer is preferably selected from polyetherimide, polycarbonate, polyphenylene sulfone, polyphenylene oxide, polyether sulfone, acrylonitrile-butadiene-styrene copolymer (ABS), acrylonitrile-styrene-acrylate copolymer (ASA), polyvinyl chloride, polyacrylate, polyester, polyamide, polyaryl ether ketone, polyether, polyurethane, polyimide, polyamideimide, polyolefin, in particular from polyurethane, and wherein the addition or mixing preferably takes place in a mixing unit.

A preferred mixing unit here advantageously takes into account low shear of the thermoplastic polymer and the anti-agglomeration agent. Suitable mixing units can be selected, for example, from a paddle mixer or a nautical mixer and the like.

According to a particularly preferred method for producing the composition according to the invention, a first mixture of the at least one polymer system and the first anti-agglomeration agent is first produced in a smaller amount, for example, in an amount of approximately 10 to 100 g, of the at least one polymer system for producing a so-called premix. Such a premix is produced, for example, in a tumble mixer. The premix can then be mixed into the polymer system, for example, by means of a mixing unit mentioned above, to obtain the final mixture or the composition according to the invention. Insofar as a particularly preferred composition comprises two anti-agglomeration agents, a premix is first produced from the second anti-agglomeration agent and the polymer system in the same manner as described above and then mixed into the polymer system to obtain the final mixture.

Such a particularly preferred method in the production of the composition according to the invention enables a homogeneous mixture of the particles of the thermoplastic polymer system with the at least one or with the at least two anti-agglomeration agents, which results in advantageous flow properties while avoiding caking effects and finally in a homogeneous melting behavior of the composition.

Furthermore, it is advantageous when the composition comprises at least one additive which allows the mechanical, electrical, magnetic and/or aesthetic powder and product properties to be adapted. In a preferred embodiment, the composition comprises at least one organic and/or inorganic additive such as glass, metal, for example, aluminum and/or copper or iron, ceramic particles or pigments for varying the color, preferably titanium dioxide or carbon black. Alternatively or additionally, the additive can also be selected from a fiber, such as, for example, a carbon or glass fiber. This can also influence the absorption behavior of the powder.

In addition to functionalization through the addition of, for example, pigments, compounds having certain functional properties can in principle also be present in one or more of the layers or in the entire molded article. Functionalization could, for example, consist in that the entire molded article, one or more layers of the molded article or only parts of one or more layers of the molded article are provided with electrical conductivity. This functionalization can be achieved by conductive pigments, such as metal powder, or by using conductive polymers, such as by the addition of polyaniline. Molded articles having conductor tracks are obtainable in this way, and these may be present both on the surface and inside the molded article.

Further features of the invention result from the following description of embodiments in connection with the claims. It should be pointed out that the invention is not limited to the embodiments of the exemplary embodiments described, but is determined by the scope of the enclosed claims. In particular, the individual features in embodiments according to the invention can be realized in a different combination than in the examples given below.

EXAMPLES

Example 1

Production of a Composition According to the Invention:
0.15% by weight of the anti-agglomeration agent (Aerosil R 812, Evonik, Germany, based on the final weight of the composition to be produced) are sieved through a vibrating sieve (Retsch, mesh size 245 µm) and then mixed in with 100 g of the polymer system (Elastollan EXP SP 9415, BASF) for 5 to 20 minutes a tumble mixer (Turbula type T2F, Willy A. Bachofen AG, 70 to 80 rpm). The mixture is then mixed in over a period of about 5 to 20 minutes to 2 kg of the polymer system in a concrete mixer (BM 140, Atika GmbH, inclination angle 30°) and then packaged in cardboard boxes having internal film sacks.

Example 2

A composition according to the invention is produced in the same way as in Example 1, except that a first mixture of a polymer (Elastollan EXP SP 9415) with a first anti-agglomeration agent (HDK H20, Wacker Chemie, Germany) is produced in the manner described above and in a second step a mixture of a second anti-agglomeration agent (Aerosil R 812, Evonik, Germany) with a polymer (Elastollan EXP SP 9415) is produced in the manner described above. The first mixture is then mixed into the total amount of the polymer (Elastollan EXP SP 9415) analogously to Example 1. The second mixture is then also mixed into the polymer and packaged (as described in Example 1). The final concentration of the first anti-agglomeration agent in the overall mixture in this case is 0.05% by weight, the final concentration of the second anti-agglomeration agent is 0.15% by weight.

Example 3

The bulk density of the composition according to the invention according to Examples 1 and 2 is determined below using a device according to DIN EN ISO 60: 2000-01.

A funnel is vertically attached with its lower opening 20 to 30 mm above a measuring cylinder (volume: 100 ml, inner diameter 45±5 mm, with polished inner surface) so that it coincides with its axis and that of the measuring cylinder.

110 to 120 ml of the composition according to the invention (according to Example 1 or Example 2) are passed through the funnel, wherein the lower opening of which is closed by a metal plate. The metal plate is then opened quickly so that the composition according to the invention flows into the measuring cylinder. The excess of the composition according to the invention is stripped off the measuring cylinder with a rod and the measuring cylinder is then weighed on a balance (Kern, Germany) taking into account its tare. The bulk densities determined here are shown in Table 1.

TABLE 1

Determined bulk densities of the compositions according to the invention.

| composition according to the invention | Bulk density [g/l] |
|---|---|
| Example 1: | 496 g/l |
| Example 2: | 509 g/l |

The invention claimed is:

1. A composition comprising:
   at least one polymer system; and
   at least two anti-agglomeration agents,
   wherein the polymer system is selected from at least one member from the group consisting of at least one thermoplastic polymer, the thermoplastic polymer being selected from polyetherimide, polycarbonate, polyphenylene sulfone, polyphenylene oxide, polyether sulfone, acrylonitrile-butadiene-styrene copolymer (ABS), acrylonitrile-styrene-acrylate copolymer (ASA), polyvinyl chloride, polyacrylate, polyester, polyamide, polyaryl ether ketone, polyether, polyurethane, polyimide, polyamide imide and polyolefin;
   wherein the bulk density of the composition being at least 300 g/l, and/or the bulk density is up to about 550 g/l;
   wherein a first anti-agglomeration agent comprises silicon dioxide, and wherein particles of the first anti-agglomeration agent are modified with at least one hydrophobizing agent based on at least one organosilane;
   wherein a second anti-agglomeration agent comprises silicon dioxide, and wherein particles of the second anti-agglomeration agent are modified with at least one hydrophobizing agent based on at least one organosilane, and
   the proportion by weight of the at least two anti-agglomeration agents is in total at most about 1%, and the first and second anti-agglomeration agents are further functionalized with amino, amide, and/or quaternary ammonium end groups.

2. The composition according to claim 1, wherein the particles of the first anti-agglomeration agent are modified with a first hydrophobizing agent which is selected from at least one member from the group consisting of alkoxysilane, silazane and siloxane.

3. The composition according to claim 1, wherein the particles of the second anti-agglomeration agent are modified with a second hydrophobizing agent which is selected from at least one member from the group consisting of alkoxysilane, silazane and siloxane.

4. The composition according to claim 1, wherein the first and the second anti-agglomeration agents have a weight ratio of at least about 1:1.

5. The composition according to claim 1, wherein the at least two anti-agglomeration agents have a BET surface area of at least about 200 $m^2/g$, and/or wherein the BET surface area of the at least two anti-agglomeration agents is at most about 350 $m^2/g$.

6. The composition according to claim 1, wherein the at least two anti-agglomeration agents have an average diameter of agglomerate particles d50 of at least about 100 nm, and/or wherein the average diameter of the agglomerate particles d50 is at most about 500 nm.

7. The composition according to claim 1, wherein an average diameter of the particles d50 of the at least one polymer system to the average diameter of the agglomerate particles d50 of the at least two anti-agglomeration agents has a ratio of at least about 100:1, and/or wherein the ratio of the average diameter of the particles d50 of the at least one polymer system to the average diameter of the agglomerate particles d50 of the at least two anti-agglomeration agents is at most about 5000:1.

8. The composition according to claim 1, wherein the polymer system is a thermoplastic polyurethane.

9. The composition according to claim 1, wherein a melting point of the composition is at least about 100° C. and/or at most about 200° C.

10. The composition according to claim 1, wherein the composition has a tensile strength of at least about 5 MPa, and/or at most about 150 MPa, and an elongation at break of at least about 1%.

11. The composition according to claim 1, further comprising at least one additive.

12. A method of producing the composition according to claim 1, the method comprising the following steps:
   providing at least one polymer system, the at least one polymer system being selected from at least one member from the group consisting of at least one thermoplastic polymer, the thermoplastic polymer being selected from polyetherimide, polycarbonate, polyphenylene sulfone, polyphenylene oxide, polyether sulfone, acrylonitrile-butadiene-styrene copolymer (ABS), acrylonitrile-styrene-acrylate copolymer (ASA), polyvinyl chloride, polyacrylate, polyester, polyamide, polyaryl ether ketone, polyether, polyurethane, polyimide, polyamide imide and polyolefin;
   adding first and second anti-agglomeration agents; and
   mixing the at least one polymer system with the first and second anti-agglomeration agents.

13. A method for producing a three-dimensional object by applying layers and selectively solidifying a construction material, the method comprising the following steps:
   providing the construction material as the composition produced by the method according to claim 12;
   applying a layer of the construction material to a construction field;

selectively solidifying the applied layer of the construction material at locations corresponding to a cross section of the three-dimensional object to be produced; and lowering a carrier of an additive manufacturing machine and repeating the steps of applying and solidifying until the three-dimensional object is completed.

14. A three-dimensional object obtained by the method according to claim 13.

15. The composition according to claim 1, wherein the composition is implemented in additive manufacturing processes.

\* \* \* \* \*